United States Patent [19]

Munz

[11] 4,308,802
[45] Jan. 5, 1982

[54] ARRANGEMENT FOR DETACHABLE JOINING OF CONSTRUCTION PARTS

[75] Inventor: Johann Munz, Hinwil, Switzerland

[73] Assignee: Team Form AG, Hinwil, Switzerland

[21] Appl. No.: 72,551

[22] Filed: Sep. 4, 1979

[30] Foreign Application Priority Data

Sep. 4, 1978 [CH] Switzerland ............... 9276/78

[51] Int. Cl.³ .................... A47B 3/06; A47B 13/02
[52] U.S. Cl. ........................ 108/156; 108/111; 108/153; 211/182; 403/24
[58] Field of Search ............ 108/153, 156, 111; 211/182; 403/367, 368, 371, 24, 264, 290, 247, 248

[56] References Cited

U.S. PATENT DOCUMENTS

| | | | |
|---|---|---|---|
| 3,092,217 | 6/1963 | Alloggio | 211/182 X |
| 3,491,706 | 1/1970 | Glass | 108/156 |
| 3,664,258 | 5/1972 | Vecchi | 403/290 X |
| 3,787,131 | 1/1974 | Reachek | 403/290 X |

Primary Examiner—James T. McCall
Attorney, Agent, or Firm—Yount & Tarolli

[57] ABSTRACT

For the joining of two construction parts (1, 7) which are, for example, a cross piece consisting of a profiled tube and a chair leg consisting of wood, the profiled tube has at the joining ends a non-round cross section and is slotted lengthwise at the end. The end is thrust into a fitted opening (8) in the part (7). In the slotted end of the tubular part (1) are two clamping pieces (10), which are rounded at the outer side (11) according to the form of the tubular part and have on the inner sides (12) facing each other, a wedge surface. Between these wedge surfaces a tension wedge (14) is tightened by means of a screw (16) extending outward between the clamping pieces, so that by means of the clamping pieces pressed against the slotted end of the tubular part, the tubular part (1) is clamped fast into the opening (8) of the part (7).

8 Claims, 14 Drawing Figures

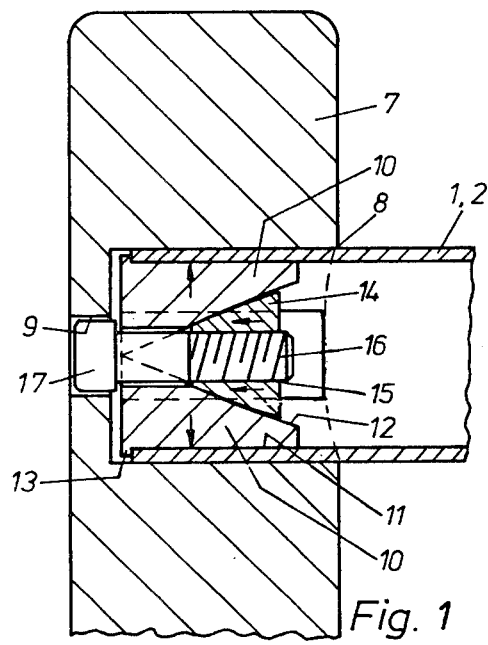
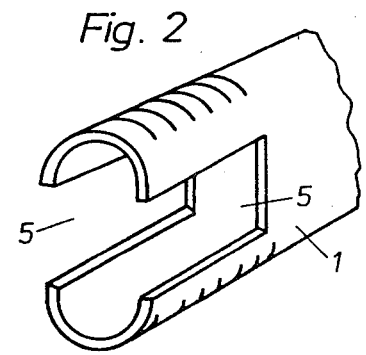
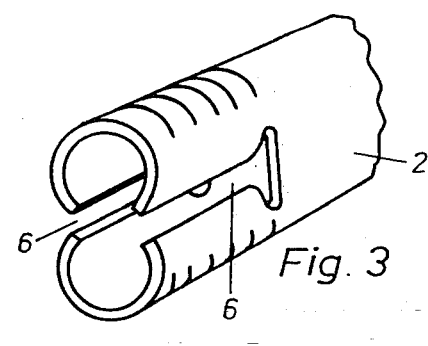
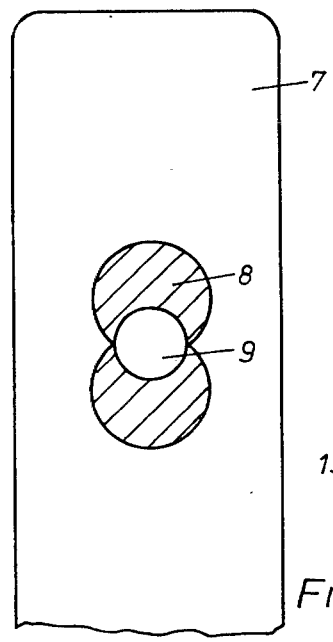
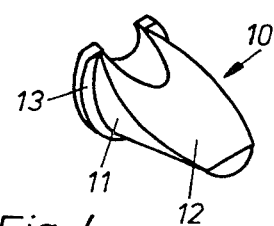
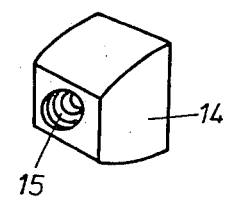

ARRANGEMENT FOR DETACHABLE JOINING OF CONSTRUCTION PARTS

The invention concerns an arrangement for detachable joining of construction parts by means of a tension wedge which can be tightened by a screw against clamping pieces, especially for detachably assembled furniture which forms a frame consisting of legs and supports joining the latter.

The idea is already known of joining the profiled tubes used as parts for frame construction or in the furniture industry, of preferably rectangular cross section, at right angles to each other, and with the end of one profiled tube lying against the outer longitudinal side of the other profiled tube, by means of a tension wedge tightened by a screw against clamping pieces, the screws extending in the axial direction of the one tube, enclosing the clamping piece and the tension wedge, passing transversely through the other profiled tube. The screw must, in this case, transmit all the force necessary for holding the parts together. The joining of the tubes is not secured against rotation, since the one profiled tube lies flush against the outside of the other profiled tube. Therefore, there has been used with profiled tubes of rectangular cross section, in the end of the tube lying flush, a disc adapted to the inner outline, with pegs projecting outward, which engage in holes at the outer longitudinal side of the other profiled tube, in order to obtain, through this form-fitting coupling, a securing against rotation. With this, such a joining is already quite expensive as to the necessary finishing processes and the number of parts needed.

In the present invention, the purpose is to join construction parts, secured against mutual rotation and in a very stable design, from which results a high load capacity of the joining, and with the least possible expenditure of finishing, the one construction part consisting of a solid material, with preferably round cross section, and the other parts consisting of a profiled tube. To obtain, in this case, with simple finishing steps to be carried out a very stable and aesthetically pleasing joining of the parts, with security against rotation (twisting) and without exclusive loading of the screw for holding the joining together, the invention proposes that a first construction part be designed, at least at the joining ends, in a tubular form with a non-round cross section and with two longitudinal slots, running parallel with each other and open at the ends, that a second construction part, extending at an angle to the axis of the first with a solid cross-section, has an opening designed to correspond to the cross section of the first construction part, for a fitting engagement of the first into the second construction part, and that the clamping pieces, adapted to the outside of the cross sectional form of the slotted end of the first construction part, and having on the inside, in each case, a wedge surface, are pressed, by means of a tension wedge, having a central threaded bore, and a screw, screwed into the tension wedge and supported at the head end against the clamping piece, on the inside, against the slotted end of the first construction part for the purpose of clamping the latter fast in the second construction part.

In one preferred form of execution, in which the opening is very simple to produce, the second construction part, consisting preferably of a wooden leg of round cross section, has an opening consisting of two partly coinciding sack-hole bores, in which, therefore, the distance of the middle of the bore is less than the diameter of one bore, and furthermore, the first tubular part, provided with lengthwise slots, has at the rough slot edges pressed inward, a cross section consisting of two circular arcs, which fits exactly into the opening consisting of the two sack-hole bores. As a variant, the first part may also have an oval cross section, interrupted by wider lengthwise slots, which fits exactly into the correspondingly formed opening. The production of two sack-hole bores, side by side, gives the least expense for forming the opening.

The advantage of the design according to the invention lies in the fact that, through the engagement of one construction part, non-round in cross section, into the other, security against rotation is obtained in simple fashion, and that the part to be engaged is slotted, so that it can be spread by the clamping pieces, pressed apart by the tension wedge, which leads to a much more solid joining of the parts than with the use of only a screw extending transversely through one construction part and into the flush adjoining construction part and transmitting only tension forces.

Another advantage, moreover, is that the oval form of the tube cross section in one, and the opening in the other construction part leaves sufficient space for screws, arranged off-center in each case and crossing one above the other, which makes it possible to fasten two equal tubular construction parts at the same height to another construction part, which may be, for example, the common leg of two neighboring chairs in a solid row of chairs, while the tubular construction parts may be the supports, designed as crossed edges, between the chair legs. Because of the off-center position of the screws from the longitudinal axis of the tubular part, clamping pieces unequal in size are necessary in each case, of which, in each case, two, together, fill out the open cross section surface on both sides of the tension screw and the tension wedge. The larger clamping piece, in each case, lies in the two openings on the opposite sides.

Other details and advantages of the invention are given from the description which follows and the drawings, in which various forms of execution of the invention are represented, purely by way of example.

FIG. 1 shows a vertical section through the joining place of two parts;

FIG. 2 shows the tubular slotted end of the first part, in perspective;

FIG. 3 shows one variant of execution of the tubular end of the first part, in perspective;

FIG. 4 shows a frontal view of the part having the opening;

FIG. 5 shows the clamping piece, in perspective;

FIG. 6 shows the tension wedge in perspective;

Figure 7:
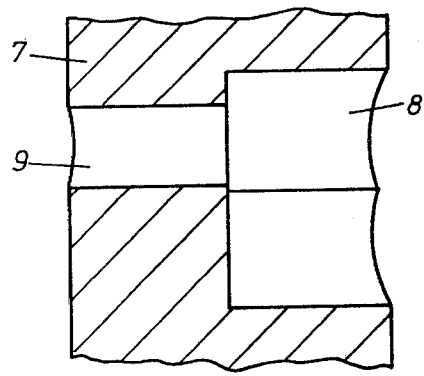
FIGS. 7 and 8 show cross section and frontal view of a modified form of execution of a part having the opening, for simultaneous fastening of two other tubular parts.

FIG. 1 shows the assembly of the parts shown in FIGS. 2 to 6. A first part 1, according to FIG. 2, is designed tubular and with oval cross section, at least at the joining ends, and has two lengthwise slots 5, running parallel with each other and open at the ends, on the opposite sides. A modified form of execution is the part 2, according to FIG. 3, in which the edges of the narrower slot 6 are pressed inward, so that this part has a cross section consisting of two circular arcs, the cross section forming, in each case, a three-fourths circular arc on each side of the slot 6.

According to FIGS. 1 and 4, a second part 7 consists of a rod of solid material, which preferably has a round cross section and is of wood, and is for example, a furniture leg. When this leg is a chair leg, the tubular parts 1 or 2 serve to join together as rungs the four chair legs.

The part 7 has an opening 8 in the form of two partly coincident cylindrical sack-hole bores. From the bottom of this opening exactly in the middle of same, a passage bore 9 leads through the remaining wall thickness of the part 7.

In FIG. 5 is shown one of two clamping pieces 10, needed for the joining of the parts. The curvature at the outside 11 of this clamping piece agrees with the curvature on the inner side of the slotted end of the tubular part 1 or 2. On the opposite side, is a diagonal surface 12, which cooperates, as a wedge surface, with a tension wedge 14, represented in FIG. 6, as appears from FIG. 1, In assembling, the clamping piece 10 lies, by an edge 13, formed at the thicker end, against the end of the tubular part 1 or 2. The tension wedge 14 has a central threaded bore 15, through which extends an Allen-head screw 16, of which the head 17 lies recessed in the part 7 in the passage bore 9, and rests against the clamping piece 10. As appears from FIG. 1, the tension wedge 14, on tightening the screw 16, is drawn in between the clamping pieces 10, so that these are pressed outward and against the end of the tubular part 1 or 2, so that the tube end is clamped fast in the part 7 by radially-acting forces.

Figure 8:
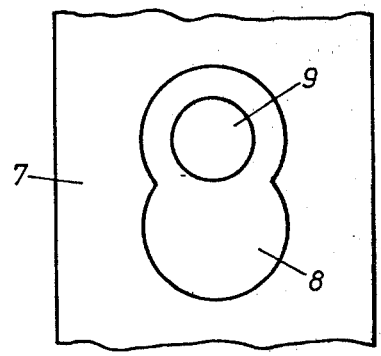
Figure 9:
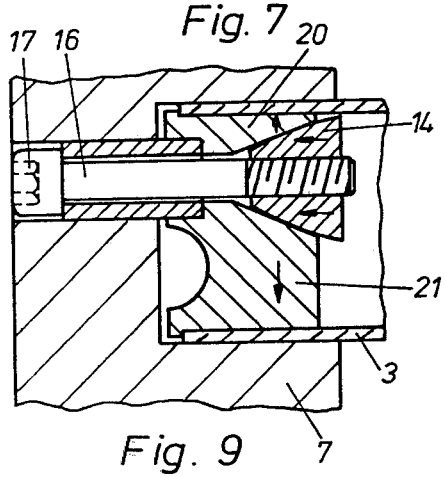
FIG. 9 shows a vertical section through the joining of a tubular part with a part having the opening, according to FIGS. 7 and 8.
Figure 13:
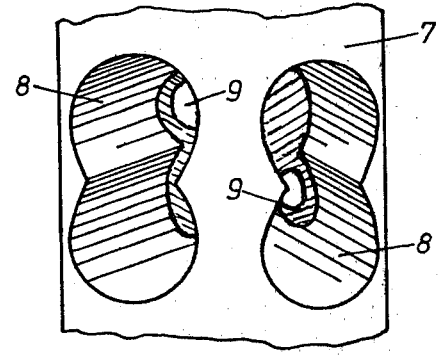
FIG. 13 is a frontal view of the part according to FIG. 12, in perspective.
Figure 12:
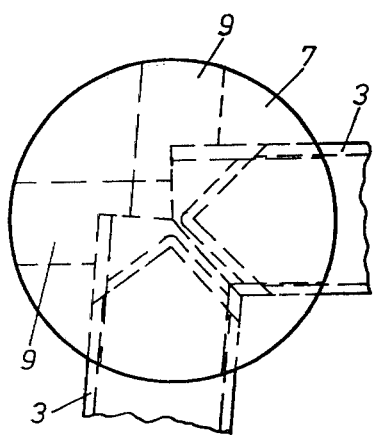
FIG. 12 is a top view of the part with two openings, sketched in broken line, which are arranged at the same height, running at an angle to each other with tubular parts, sketched in broken lines, in the openings.
Figure 10:
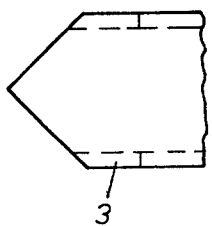
FIG. 10 is a top view of the end of the tubular part according to FIG. 9.
Figure 11:
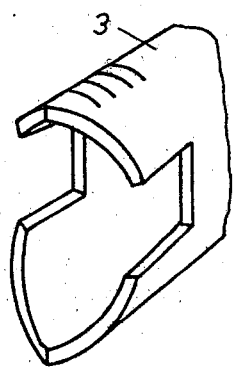
FIG. 11 is a perspective view of the end of the tubular part according to FIG. 10.

The part 7, represented in FIGS. 7 and 8 in section and in frontal view, with the opening 8, differs from the part 7 according to FIGS. 1 and 4 only by the off-center arrangement of the passage bore 9, from the center of the opening. This passage bore runs concentric with one of the two sack-hole bores forming the opening. From FIG. 9, it can be seen that because of the off-center position of the screw 16, the clamping pieces 20 and 21, filling the open cross section surfaces on both sides of the screw 16 and the tension wedge 14, must be of unequal size. This embodiment is used for fastening to the part 7, at the same height, two tubular parts 3, including an angle between them. These are, varying from the tubular parts 1 or 2, beveled at the ends, as appears from the top view according to FIG. 10 and the perspective representation according to FIG. 11. From FIG. 12 it appears that these tubular parts 3, to be fastened at the same height, can only be thrust into an opening, in each case, up to the middle of the part 7 where the tubular parts are in contact at their beveled ends. For this reason, the opening 8 in the part 7 is less deep than in the form of execution according to FIGS. 1 and 4, and extends only to the middle of the part 7. In the diagram according to FIG. 13, it can be seen that the off-center passage bore 9 for the screw 16 in the one opening 8 in the upper half, and in the other opening in the lower half, is designed the same. In this way, two screws crossing each other, one above the other, can extend through the part 7, to join two tubular parts 3 at the same height on the part 7. This part 7 may be, in such a case, the common leg of two neighboring chairs in solid row of chairs, while a cross piece may be fastened to this leg from one chair and to another cross piece from another chair in the form of tubular parts 3.

Figure 14:
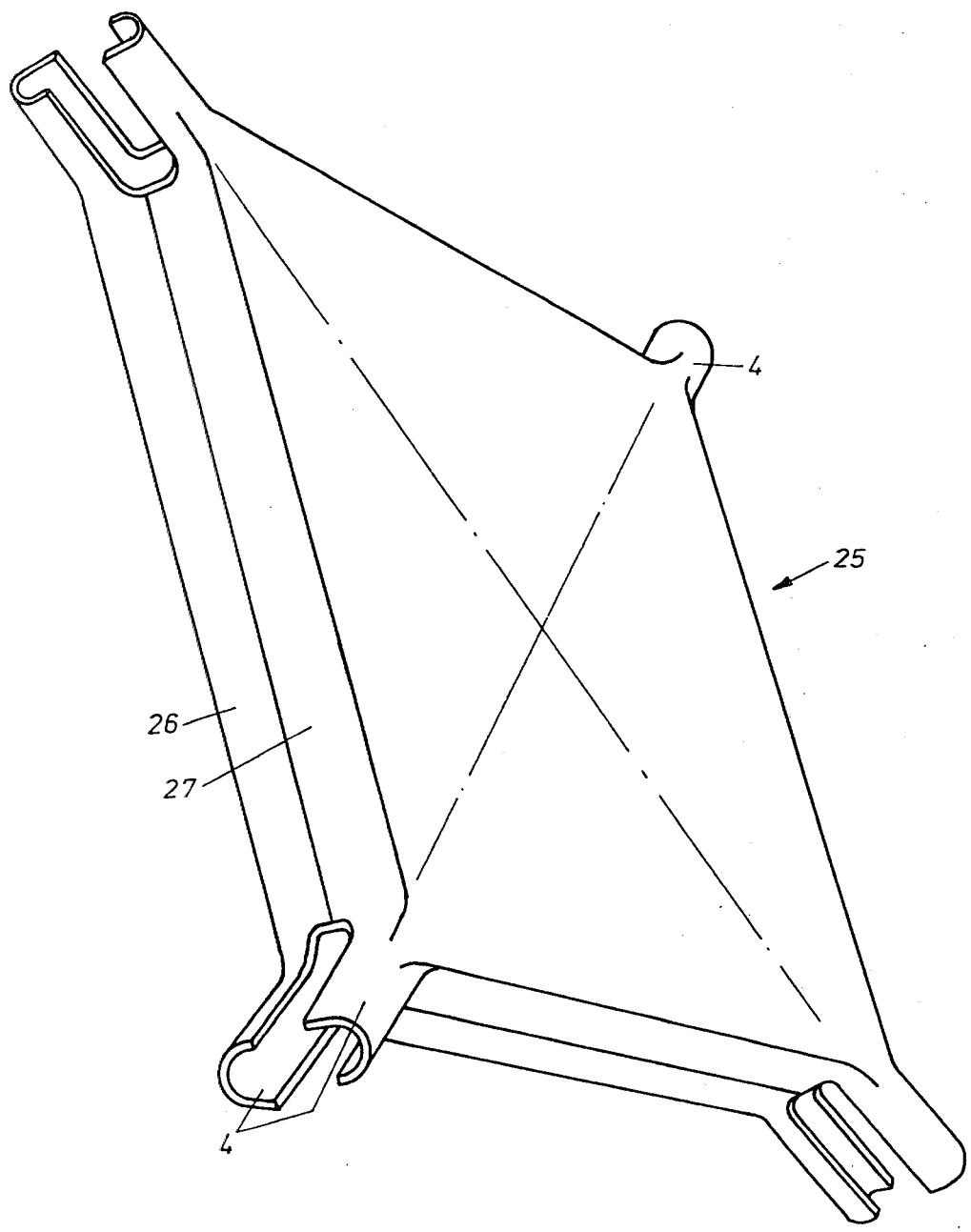
FIG. 14 shows a table, formed of sheet metal parts, with tubular sections at the corners, in perspective.

In FIG. 14 is shown a table 25, which consists of box-type formed sheet metal parts 26 and 27, which are joined together at their edges lying one above the other. At the four corners are formed, in each case, sections with circular arc-form cross section, which form an oval tubular part 4 for thrusting into an opening 8 in a part 7. The fastening takes place in the same way as in the part 1 according to FIG. 2. In this way, the production of a shelf is possible also.

The purpose of the present invention is to proved a well-shaped and stable joining of individual parts for detachably assembled furniture, which consists of a definite number of parts, of which the parts, performing in each case the same function, as for example, the leg or the cross piece is present in different sizes and can be assembled with other elements, by the building-box principle, to a different piece of furniture in each case. With a piece of furniture detachably assembled in this way, the problem of storage and transportation is greatly simplified since the furniture takes much less space in the disassembled condition.

I claim:
1. Apparatus, comprising
   a first construction part,
   a second construction part,
   said first construction part being constructed for being detachably connected in a connected position to a second construction part by a connection end on the first part being located in a connection opening on the second part,
   said connection end having a tubular portion being non-round in cross section, having two longitudinal slots extending approximately parallel with each other and with the tubular axis, and having an open outer end on each slot,
   said second construction part extending in connected position at an angle to the first construction part, being solid in cross section, and having said connection opening, corresponding in cross-sectional shape to the tubular portion of the connection end of the first construction part for the telescopic engagement of the first construction part into the second construction part, and
   a set of clamping pieces having their outer surfaces constructed to telescopically receive said tubular portion and the slotted end of the first construction part, and having inner wedge surfaces,
   a tension wedge having a central threaded bore and wedging outer surfaces engaging the wedge surfaces of said clamping pieces, and
   a screw screwed into the threaded bore in the tension wedge, supported by its head end operatively bearing against the clamping pieces, and having its threaded shank locatable within the inside of the tubular bore and the connection end of the first construction part.

2. Apparatus, according to claim 1, further comprising
the first construction part being at its connection end a metal profiled tube, and
the second construction part being a rod of solid, non-ferrous material, preferably wood.

3. Apparatus, according to claims 1 or 2, further comprising
the first construction part having at its connection end an oval cross section interrupted by the longitudinal slots.

4. Apparatus, according to claims 1 or 2, further comprising
the first construction part having at its connection end the edges of its slots pressed inwardly, and its tubular portion in cross section comprising two circular arcs extending in each case over more than 180 degrees.

5. Apparatus, according to claims 3 or 4, further comprising
the opening in the second construction part, for receiving the fitting engagement of the connection end of the first construction part, being formed of two partly coincident cylindrical bores.

6. Apparatus, according to claims 1, 2, 3 or 4, further comprising
the screw head of the screw being sunk into the passage in the second construction aligned with the opening with its screw constructed to extend into the tubular portion of the first construction part.

7. Apparatus, according to claims 1, 2, 3, 4 or 5, further comprising
two equal first construction parts,
said construction parts being constructed and arranged when assembled so that there is an angle between said first construction parts for the purpose of fastening them at the same height to the second construction part;
said two first construction parts being joinable with the second construction part
by means of two screws having axis crossing each other and located one above the other in the second construction part, for extending into the tubular portions of the respective first construction parts, and
by means of two sets of clamping pieces, the clamping pieces in each set being of unequal sizes, and with one set of clamping pieces locatable in the tubular portion of each of said first construction parts for coacting with its tubular portion, screw and tension wedge.

8. Apparatus, according to claim 1, further comprising
the first construction part comprising two sheet metal parts deformed into box-shape, and joined together at their edges,
said last mentioned first construction part having at at least some of its corners a connection end arc-shaped in cross section, and constructed and arranged to be clamped fast into the connection opening of the second construction part by means of the clamping pieces.

* * * * *